United States Patent [19]

DeBiasi et al.

[11] Patent Number: 4,945,443

[45] Date of Patent: Jul. 31, 1990

[54] ELECTRONIC CIRCUIT INTERRUPTER WITH COMBINED KEYPAD AND DISPLAY

[75] Inventors: Mark S. DeBiasi, Windsor; Robert J. Danek, Andover; Hanns P. Sailer, Plainville; Ira B. Goldman, Waterbury; David J. Lesslie, Plainville, all of Conn.

[73] Assignee: General Electric Company, New York, N.Y.

[21] Appl. No.: 407,503

[22] Filed: Sep. 14, 1989

[51] Int. Cl.[5] .............................................. H02H 3/08
[52] U.S. Cl. ...................................... 361/93; 361/357; 361/400
[58] Field of Search ................... 361/87, 97, 102, 390, 361/392, 400, 357; 280/711, 789

[56] References Cited

U.S. PATENT DOCUMENTS

| | | | |
|---|---|---|---|
| 4,589,052 | 5/1986 | Dougherty | 361/94 |
| 4,672,501 | 6/1987 | Bilac et al. | 361/96 |
| 4,728,914 | 3/1988 | Morris et al. | 335/6 |
| 4,751,605 | 6/1988 | Mertz et al. | 361/91 |
| 4,814,712 | 3/1989 | Burton et al. | 324/424 |
| 4,870,531 | 9/1989 | Danek | 361/93 |

Primary Examiner—Derek S. Jennings
Attorney, Agent, or Firm—Richard A. Menelly; Walter C. Bernkopf; Fred Jacob

[57] ABSTRACT

An electronic circuit interrupter digital display and keypad device includes a display to view circuit breaker settings combined with a keypad to select settings and values to be displayed. The display and keypad device connects to an electronic trip unit within the circuit interrupter by means of a tamper-free seal to prevent the circuit interrupter set points from being changed without authorization. Alternatively, a password-operated control switch provides a similar function.

12 Claims, 3 Drawing Sheets

ELECTRONIC CIRCUIT INTERRUPTER WITH COMBINED KEYPAD AND DISPLAY

BACKGROUND OF THE INVENTION

This invention relates to solid state circuit interrupters employing digital electronic trip units. One such solid state circuit interrupter is described within U.S. Pat. No. 4,589,052, which Patent is incorporated herein for purposes of reference. Such electronic trip units are used in circuit interrupters and are capable of acting on a number of programmed parameters to interrupt the circuit being protected in a timely manner. One such electronic trip unit which allows for user interaction, provides capability both to select trip parameters and to view the selected trip parameters is found within U.S. Pat. No. 4,672,501, which Patent is also incorporated herein for purposes of reference.

For purposes of reducing cost while maintaining accuracy and functionality of the electronic trip units, microprocessors are being employed to gather information, process the information, and provide a means of monitoring the information using associated digital circuitry. The use of such microprocessors allows more protection functions to be contained in smaller-sized packages. Smaller-sized circuit interrupters, however, do not contain the means required to enter data or to view the data being processed. Typically with molded case circuit interrupters, the size of the case limits the amount of area available for such user-interface equipment. The user-interface equipment employed on larger-sized molded case circuit interrupters typically consists of rotatable switches or potentiometers on the cover with associated printed indicia to indicate the relative switch positions. The amount of area available on the cover of such circuit interrupters is also limited and hence reduces the number of optional features requiring additional switches and potentiometers.

A separate portable display and keypad in the form of a self-contained unit, powered by an internal power supply and which contains a microprocessor and associated circuitry and which communicates with the circuit interrupter trip unit by use of an infrared transmitter is described within U.S. Pat. No. 4,751,605. This arrangement requires a separate microprocessor and related digital circuitry within the portable display and keypad which adds to the overall costs of the circuit interrupter.

U.S. Pat. No. 4,814,712 "Test Kit for a Circuit Breaker Containing an Electronic Trip Unit" describes a separate portable display and keyboard unit that is capable of reading stored set points within an associated circuit interrupter but is incapable of changing the set point parameters. U.S. patent application Ser. No. 232,035 filed Aug. 15, 1988 entitled "Circuit Breaker with Removable Display and Keypad" also describes a keypad and display arrangement and is incorporated herein for reference purposes.

It would be advantageous to provide a user-interface unit to a circuit interrupter which interfaces with the electronic trip unit to display and set the electronic trip unit parameters while keeping the size and cost of the user-interface unit within practical economic limits. Additionally, the user-interface unit should contain display capability for all possible circuit interruption options by means of software located solely within the trip unit microprocessor.

Circuit interrupters that currently provide independent set point adjustment, position a removable cover over the adjustment means for security reasons. The cover is usually sealed to the housing of the circuit interrupter by means of a crimped security wire looped through a hole in the circuit interrupter housing and a hole in the cover. To change the settings of the trip unit, the wire must be cut, the cover removed and then replaced. This does not prevent unauthorized access, but merely provides an indication that such unauthorized access has taken place.

It would be advantageous to provide security to trip parameters stored within an electronic trip unit to prevent tampering or accidental modification of the trip unit settings without requiring a security wire.

Accordingly, one purpose of this invention is to provide a simple, inexpensive user-interface device which allows an operator to display and set the trip parameters of an electronic circuit interrupter while at the same time preventing unauthorized access to the trip parameters.

Another purpose of the invention is to provide a less expensive combined keypad display unit having all the features of state-of-the-art keypad and display units that are separately arranged on the circuit breaker cover.

SUMMARY OF THE INVENTION

A circuit interrupter containing an electronic trip unit interfaces with a combined digital display and keypad unit arranged on the exterior of the interrupter housing. The digital display and keypad unit provides a user-interface to display the trip unit parameters and to enter the trip unit settings. Since the trip unit settings are only accessible through this user-interface, unauthorized access to the trip unit settings is avoided by a security wire or by means of a password entry command.

DESCRIPTION OF THE PREFERRED EMBODIMENT

Figure 1:
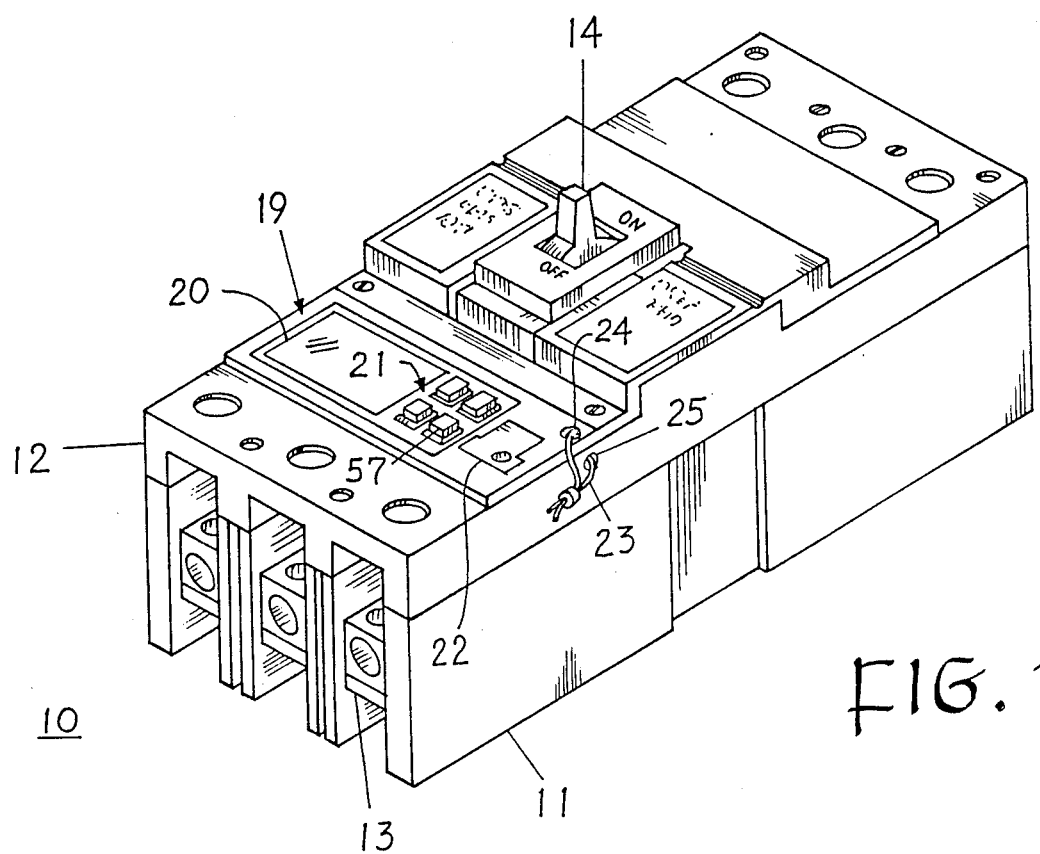
FIG. 1 is a top perspective view of a digital circuit interrupter with the combined keypad and display unit according to the invention.

A circuit breaker employing an electronic trip unit, hereafter "electronic circuit interrupter" is depicted at 10 in FIG. 1. The electronic circuit interrupter includes a case 11 closed by a cover 12 and electrical connection is made with the circuit interrupter by means of the line terminals 13 at one end and through corresponding load terminals at an opposite end (not shown). An operating handle 14 provides manual intervention to open the circuit breaker contacts 15–17 which are otherwise automatically controlled by means of an electronic trip unit circuit 18 (FIG. 2) which is contained within the cover of the electronic circuit interrupter. The combined keypad and display unit 19 consisting of the display 20 and keypad 21 including the entry keys 57 is positioned over and electrically connected with the trip unit. To insure that the circuit interruption set points are not interfered with once entered in the trip unit memory, a sealing loop in the form of a wire 23 is inserted through a pair of holes 24, 25 through the keypad and display unit and the circuit interrupter cover next to the rating plug 22. The rating plug and its function is described within U.S. Pat. No. 4,728,914.

Figure 2:
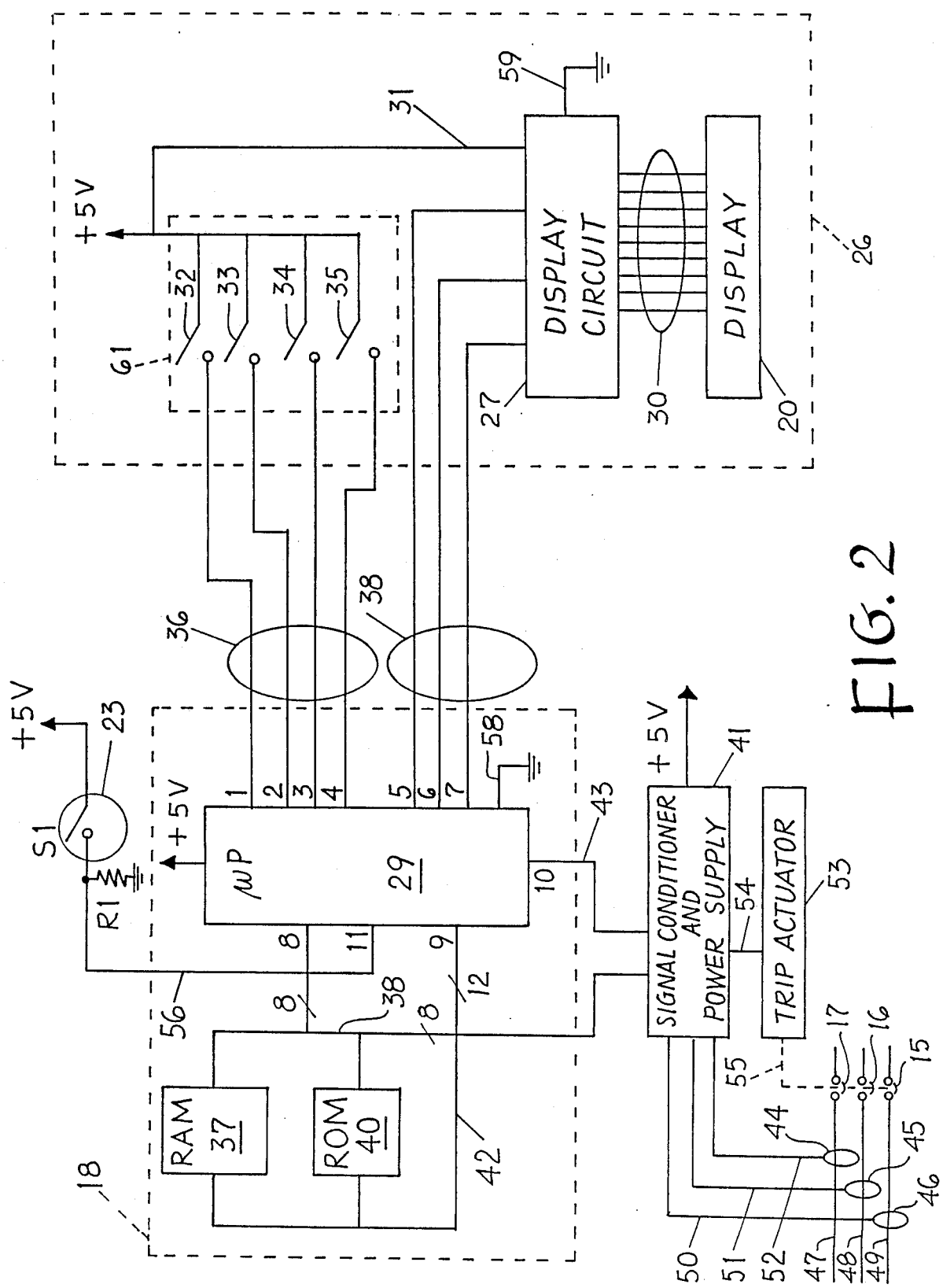
FIG. 2 is a diagrammatic representation of the digital circuit interrupter circuit and the keypad and display unit circuits.

As shown in FIG. 2, the sealing loop wire 23 interacts with a microswitch $S_1$ which connects the trip unit circuit 18 with a 5 V power supply. Once the wire is disturbed, the power supply is immediately disconnected from the trip unit circuit which indicates to the operator that such a condition has occurred. The electronic trip unit circuit is similar to that described within aforementioned U.S. Pat. No. 4,672,501 and connects with the electronic keypad and display circuit 26 through cables 36, 38 and I/O ports (1-7) on the microprocessor 29. The display circuit 27 connects with the display 20 over cable 30 and with the keypad circuit 61 over conductor 31. The keypad circuit 61 includes 4 switches 32-35 which connect with I/O ports (1-4) of the microprocessor over cable 36. As discussed within the aforementioned U.S. patent application Ser. No. 232,035, ROM 40, RAM 37 and signal conditioner and power supply circuit 41 directly connect with the 8-bit data bus 38 which connects with the microprocessor at I/O port 8. The 12-bit address bus 42 directly connects with RAM 37, ROM 40 and with the microprocessor 29 at I/O port 9. Control line 43 connects the signal conditioner and power supply circuit 41 with I/O port 10 of the microprocessor. Operating power to the electronic trip unit circuit 18 is provided by the signal conditioner and power supply circuit which connects with the current transformers 44-46 within the 3-phase conductors (47-49) of the electrical power distribution circuit by means of conductors (50-52).

As described within the aforementioned U.S. Pat. No. 4,672,501, circuit current through the phase conductors is sensed within the current transformers and is rectified and transformed to a representative voltage signal within the signal conditioner and power supply circuit. The microprocessor compares the sensed voltage signal to set point values stored in the RAM in accordance with a set of operating programs stored in the ROM. Upon the occurrence of an overcurrent condition on any one of the conductors a time delay is determined within the microprocessor. After completion of a prescribed time delay, a trip signal is outputted from the microprocessor to the signal conditioner and power supply circuit and from there to a trip actuator 53 over conductor 54. The trip actuator is in the nature of a flux shift trip operator which interacts to open the contacts as indicated by the dashed connection 55.

The operation of the keypad and display unit is seen as follows. The microprocessor 29 in the electronic trip unit 18 periodically determines the display segment data which is active for viewing based on the closures of the switches (32-35) which are associated with the keypad, and from data stored in ROM 40 and RAM 37. The display segment data is sent to the display circuit 27 from the microprocessor over cable 38 in the form of a clocked serial bit stream. The clock for the serial data is supplied by the microprocessor to the display circuit over cable 38. This display data is inputted to the display over cable 30 as described earlier.

The contents of the display memory is sent to the display upon command from the microprocessor in the electronic trip unit circuit by means of commands over cable 38. Each bit within the memory corresponds to one segment of the display. A logic "1" indicating that the associated segment is visible, or ON, and a logic "0" indicating that the associated segment is not visible, or OFF. The serial bit stream receiver, data memory, and display driver circuits are all contained within a commercially available display driver, such as a type MSM5265GS, obtained from the OKI Semiconductor Company.

The entry keys 57 (FIG. 1) of the keypad 21 are connected in a normally open circuit arrangement as indicated by the associated switches (32-35). One side of each switch is connected to the conductor 31, the other side of each corresponding switch is connected to the microprocessor over cable 36. When any one of the switches is closed, 5 V is presented at the associated I/O port of the microprocessor. The microprocessor senses this voltage as a "high" input at the corresponding I/O port, indicating that the particular switch has been closed. Power is supplied to both the trip circuit 18 and the keypad and display circuit by means of a 5 V supply. Ground connection with the circuits is made by means of conductors 58 and 59.

Security is provided to the trip unit circuit to insure that the trip parameters stored in the RAM are not changed. The security is in the form of the sealing wire 23 and interlock switch $S_1$. The interlock switch $S_1$ is held in the closed position by means of the sealing loop wire 23 to maintain connection between the 5 V power supply and the conductor 56 providing a "1" signal to the I/O port 11. If the sealing loop wire is removed, the interlock switch which is spring-biased to its open position presents a "0" signal to the I/O port 11 which indicates to the microprocessor that the sealing loop wire has been removed and allows the operator to change the stored trip parameters. Security to the electronic trip unit circuit is also provided in the form of a "Password" arrangement whereby a sequence of key closures in a predetermined order is required before the microprocessor will display information and accept data for changing the stored trip parameters.

To operate the keypad and display unit, the operator presses a key on the keypad, causing the microprocessor in the electronic trip unit circuit to sense the closure and recognize that the keypad and display circuit is properly connected. The microprocessor begins sending data to the display for viewing, and allows the operator to change the trip parameters stored in the RAM.

Figure 3:
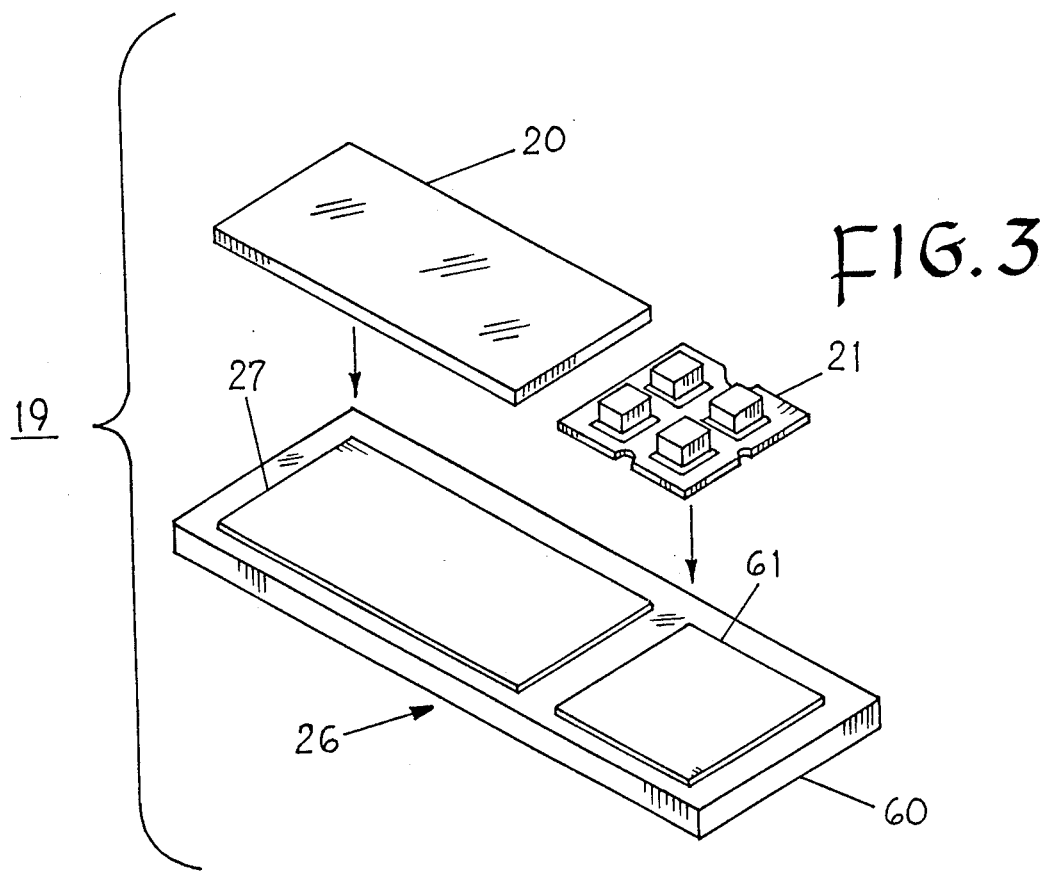
FIG. 3 is a top perspective view of the keypad and display unit of FIG. 1 prior to assembly.

The keypad and display unit 19 as depicted in FIG. 1 differs from that described in the aforementioned U.S. patent application Ser. No. 232,035 by the provision of a common substrate 60 of glass or durable plastic whereupon both the display circuit 27 and keypad circuit 61 are deposited to form the combined keypad and display circuit 26 as shown in FIG. 3. Thereafter the display 20 in the form of a liquid crystal is mechanically and electrically joined to the display circuit and the keypad 21 is mechanically and electrically joined to the keypad circuit to complete the assembly of the keypad and display unit 19.

Figure 4:
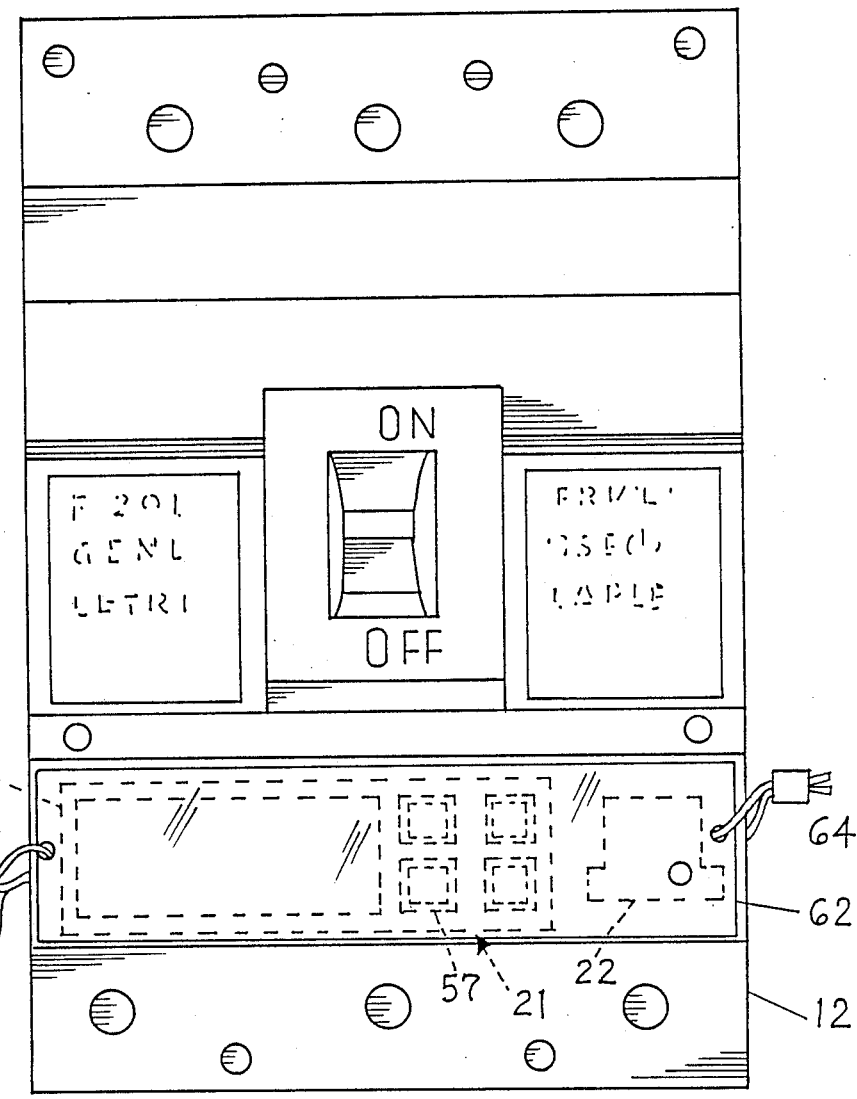
FIG. 4 is a top plan view of an alternate embodiment of the circuit interrupter of FIG. 1.

A simple method for securing the set points stored within the electronic trip unit is depicted in FIG. 4 wherein a plate 62 of transparent durable plastic such as Lexan ® which is a trademark of GE Company for polycarbonate resin is arranged over the keypad and display unit 19 on the circuit interrupter 1? . The plastic is secured at both ends by sealing wire loops 63, 64 which attach the plate to the cover 12. There is no interlock switch required to prevent access to the keys 57 on the keypad 21 or to the rating plug 22. The password arrangement, described earlier, can also be employed to further prevent access to the stored trip parameters in the event that the sealing loop wires are destroyed and the plate is removed.

An economical keypad and display unit for controlling electronic circuit interrupters has herein been described. The keypad and display unit is formed on a common substrate for ease and economy. The electronic circuit interrupter includes means for preventing the unauthorized display and alteration of the stored set point data.

Having thus described our invention, what we claim as new and desire to secure by Letters Patent is:

1. An electronic circuit interrupter comprising:
   a plastic case and a plastic cover;
   a pair of separable contacts within said case arranged for automatic separation upon occurrence of an overcurrent condition through said contacts;
   an electronic trip unit within said cover and electrically connected with an associated electric power distribution circuit, said electronic trip unit including a microprocessor and memory storage elements containing fixed set point parameters;
   a keypad and display unit within a recess formed within said cover, said keypad and display unit being interlocked with said microprocessor by means of a sealing wire passing through said keypad and display unit and said cover; and
   a power supply connected with said microprocessor through a disconnect switch, said disconnect switch being held in a closed position by means of a sealing wire passing through said cover and said keypad and display unit whereby removal of said wire opens said disconnect switch to provide a logic signal to said microprocessor.

2. The circuit interrupter of claim 1 wherein said sealing wire passes through a part of said cover.

3. The circuit interrupter of claim 1 wherein a predetermined series of entries on said keypad and display unit is required before said microprocessor can become operative to change said set point parameters.

4. The circuit interrupter of claim 1 wherein said keypad and display unit includes a keypad operating circuit and a display operating circuit.

5. The circuit interrupter of claim 1 wherein said keypad and display unit comprises a keypad and a display.

6. The circuit interrupter of claim 4 wherein said keypad circuit and said display circuit are deposited on a common substrate.

7. The circuit interrupter of claim 1 including an accessory cover on said molded plastic cover.

8. An electronic circuit interrupter comprising:
   a plastic case and a plastic cover;
   a pair of separable contacts within said case arranged for automatic separation upon occurrence of an overcurrent condition through said contacts;
   an electronic trip unit within said cover and electrically connected with an associated electric power distribution circuit, said electronic trip unit including a microprocessor and memory storage elements containing fixed set point parameters;
   a keypad and display unit within a recess formed in said cover for providing operator access to change said set point parameters; and
   a security plate arranged over said keypad and display and fastened to said cover by means of a sealing wire at one end to thereby prevent access to said keypad and display unit without removing said sealing wire.

9. The electronic circuit interrupter of claim 8 wherein said plate comprises light transmissive plastic.

10. The electronic circuit interrupter of claim 8 including a sealing wire at an opposite end of said plate.

11. The electronic circuit interrupter of claim 8 wherein said sealing wire passes through a part of said plate and a part of said cover.

12. The electronic circuit interrupter of claim 8 wherein said microprocessor requires a predetermined series of entries on said keypad and display unit before said trip parameters can be changed.

* * * * *